(12) United States Patent
Hardy et al.

(10) Patent No.: US 7,974,232 B2
(45) Date of Patent: Jul. 5, 2011

(54) METHOD AND APPARATUS FOR MANAGING COMMUNICATIONS WITHIN A DISTRIBUTED NETWORK

(75) Inventors: Leor Hardy, Givatayim (IL); Yariv Oren, Magshimim (IL)

(73) Assignee: Virtual Extension Ltd., Givatayiim (IL)

( * ) Notice: Subject to any disclaimer, the term of this patent is extended or adjusted under 35 U.S.C. 154(b) by 555 days.

(21) Appl. No.: 11/289,643

(22) Filed: Nov. 30, 2005

(65) Prior Publication Data
US 2007/0116063 A1    May 24, 2007

Related U.S. Application Data

(60) Provisional application No. 60/738,025, filed on Nov. 21, 2005.

(51) Int. Cl.
*H04B 7/212* (2006.01)
*H04B 7/15* (2006.01)

(52) U.S. Cl. .......... 370/324; 370/350; 455/11.1; 455/16

(58) Field of Classification Search .................. 370/324, 370/329, 331, 332, 350, 503–514
See application file for complete search history.

(56) References Cited

U.S. PATENT DOCUMENTS

| | | | |
|---|---|---|---|
| 6,785,513 B1 * | 8/2004 | Sivaprakasam | 455/63.1 |
| 6,801,512 B1 * | 10/2004 | Cudak et al. | 370/332 |
| 7,123,593 B1 * | 10/2006 | Marque-Pucheu et al. | 370/324 |
| 7,162,554 B1 * | 1/2007 | Cole et al. | 710/104 |
| 2004/0037282 A1 * | 2/2004 | Boland et al. | 370/392 |
| 2004/0100899 A1 * | 5/2004 | Mahamuni | 370/216 |

* cited by examiner

*Primary Examiner* — Seema S Rao
*Assistant Examiner* — Wanda Z Russell
(74) *Attorney, Agent, or Firm* — The Law Office of Michael E. Kondoudis

(57) ABSTRACT

Some embodiments of the present invention relate to an apparatus for managing communications within a distributed network. According to some embodiments of the invention, the apparatus may include a communication management module and a synchronization module. The communication management module may be operatively coupled to a communication module belonging to the distributed network. The communication management module may be adapted to allocate for each communication within the network a communication frame comprised of a predetermined number of timeslots. The communication management module may configure the communication module coupled thereto to repeat a communication at one or more of the timeslots of the frame allocated for the communication. The timeslots may, for example, be equal in length and may each correspond to a predetermined fraction of the length of a communication frame. The synchronization module may be adapted to synchronize frames across the distributed network, either directly or indirectly. According to further embodiments of the invention, the synchronization module may be adapted to bit synchronize the communication module.

34 Claims, 6 Drawing Sheets

METHOD AND APPARATUS FOR MANAGING COMMUNICATIONS WITHIN A DISTRIBUTED NETWORK

FIELD OF THE INVENTION

The present invention generally relates to the field of wireless communication networks. More specifically, the present invention relates to a method and an apparatus for managing communications within a distributed network.

BACKGROUND OF THE INVENTION

In some distributed systems, such as distributed command and control systems, for example, it is known to implement a wireless network in order to enable a central unit (e.g., a command and control unit) to communicate with the physically removed functional units. In order for the distributed system to operate, the command and control unit and each of the functional units (e.g. transceivers) must be able to communicate with one another. For this purpose, a transceiver is commonly coupled to each functional unit to enable the functional units to exchange data, such as control signals or operation parameters, with the central unit and vice-versa.

Unfortunately, experience has shown, that the above described network structure does not perform efficiently in many cases. For example, if the distance between a certain transceiver and a central unit is too great, or if there is some other disturbance or obstacle disturbing or preventing communications between the transceiver (and the functional unit coupled thereto) and the central unit, the exchange of data between the central unit and the functional unit will be hampered, as well as the operation of the system as a whole.

Theoretically, each transceiver has the ability to receive and transmit communications arriving from one of the other transceivers within the network. Therefore, it would seem, that a transceiver (or a sequence of transceivers) that is within range of the central unit may be used as a relay for a transceiver(s) that is too distant to directly communicate with the central unit. The relay transceiver(s), in this case, will receive from the too distant transceiver communications intended to the central unit and will retransmit the communications to the central unit, and vice-versa, if necessary. Similarly, it would seem, that a transceiver (or a sequence of transceivers) in communication with a central unit might be used to provide an alternative communication path between a certain transceiver and the central unit, in case the direct communication path between the transceiver and the central unit is blocked or otherwise interrupted.

Unfortunately, in many cases this solution is unsuitable. Without the addition of resources and suitable logic, each transceiver will retransmit a communication received from another transmitter without any control or restriction and with no synchronization with the other transceivers. The retransmitted signal may be received by the other transceivers and retransmitted over and over again. Consequently, many of the network's communication paths will soon become congested, significantly reducing the network's performance, and preventing the transceivers from retransmitting additional communications.

In order to overcome some of these problems, it has been suggested to add routers to the network. Routers are used, for example, as an intermediate relay, positioned between an otherwise too distant transceiver(s) and a central unit, to enable the transceiver(s) and the central unit to communicate over enhanced distances, and/or to create an alternative communication path to bypass interference in the communication path between a certain transceiver(s) and the central unit.

Routers however, are usually substantially more complex than the transceivers coupled to the functional units and must include additional processing and memory resources. In addition, routers usually include substantially sophisticated logic, which is not necessary in transceivers. This complexity is translated not only to a substantially higher cost, but also to a more complex setup. Thus, the introduction of routers into a wireless network entails increased costs and necessitates a professional installation and setup, as well as maintenance, which increase costs even further.

SUMMARY OF THE INVENTION

There is thus a need for a system, method and device to enable one or more nodes within a network to communicate with one or more other nodes within the network which cannot be reached with via a direct transmission, for example, since the destination nodes are distant, or in another example, since the there is some local interference blocking a direct transmission to the destination node. There is a further need for such a system, method and device which implement relatively inexpensive resources.

Some embodiments of the present invention relate to an apparatus for managing communications within a distributed network. According to some embodiments of the invention, the apparatus may include a communication management module and a synchronization module. The communication management module may be operatively coupled to a communication module belonging to the distributed network. The communication management module may be adapted to allocate for each communication within the network a communication frame comprised of a predetermined number of timeslots. The communication management module may configure the communication module coupled thereto to repeat a communication at one or more of the timeslots of the frame allocated for the communication. The timeslots may, for example, be equal in length and may each correspond to a predetermined fraction of the length of a communication frame. The synchronization module may be adapted to synchronize frames across the distributed network, either directly or indirectly. According to further embodiments of the invention, the synchronization module may be adapted to bit synchronize the communication module.

According to some embodiments of the invention, the communication management module may be adapted to configure the communication module to repeat a communication at one or more timeslots of a frame subsequent to the initial transmission of the communication. The communication management module may also be adapted to configure the communication module to transmit a new communication at the first timeslot of the frame allocated for that communication. The communication management module may be further adapted to configure the communication module to repeat a communication received during a certain frame at one or more timeslots subsequent to the receipt of the communication.

The communication management module may be adapted to configure the communication module to repeat a communication up-to the end of the frame allocated for the communication. The communication management module may be adapted to configure the communication module to repeat a communication up-to a predetermined timeslot or until an indication is received that the communication was repeated by another communication module, other than by a communication module from which the communication was received. The communication management module is adapted to configure the communication module to alter the amplitude of each repeated communication. The communication management module may be adapted to configure the communication module to randomly alter the amplitude of each repeated communication.

According to some embodiments of the invention, the communication management module may be further adapted to switch the communication module to a listening mode following a transmission of a communication. The communication management module may be adapted to maintain the communication module in the listening mode for a predetermined number of timeslots. The communication management module may be adapted to maintain the communication module in the listening mode during at least two timeslots.

According to some embodiments of the invention, the apparatus may further include a storage medium. The communication management module may be adapted to temporarily store a communication transmitted by the communication module while the communication module is in the listening mode.

According to some embodiments of the invention, the communication management module may adapted to instruct the communication module to repeat a communication transmitted by the communication module only in case no indication is received while the communication module is in the listening mode that the communication was transmitted by another communication module, other than by a communication module from which the communication was received. The communication management module may be adapted to switch the communication module to a standby mode in case an indication is received that a communication transmitted by the communication module was transmitted by another communication module, other than the communication module from which the communication was received, or beyond a predefined timeslot.

According to some embodiments of the preset invention, the communication management module may be adapted to include in each communication frame a selected number of functional timeslots and a predefined number of buffer timeslots which may be the concluding timeslots of the frame. The communication management module may be adapted to select the number of functional timeslots to be included in each communication frame in accordance with the number of repetitions determined to be required to deliver the communication to its destination. The communication management module may be adapted to select the number of functional timeslots to be included in each communication frame in accordance with the number of repetitions determined to be required to deliver the communication to a central unit within the network. The communication management module may be adapted to adjust the number of functional timeslots to be included in each communication frame in case the number of timeslots required for delivering the communication to the central unit changes. The communication management module may be adapted to adjust the number of functional timeslots to be included in each communication frame in case one or more of the buffer timeslots is used to deliver the communication to its destination.

Further embodiments of the present invention relate to a method of managing communications within a distributed network. According to some embodiments of the present invention, the method of managing communication within the distributed network may include bit synchronizing each of a plurality of communication modules within the distributed network, allocating for each communication within the network a communication frame comprised of a predetermined number of timeslots, and configuring each of the plurality of communication modules within the network to repeat the communication at one or more timeslots of the communication frame allocated for the communication.

Yet further embodiments of the present invention relate to a system for managing communications within a distributed network. According to some embodiments of the present invention, the system may include two or more communication management modules and two or more synchronization modules. Each of the communication management modules may be adapted to allocate for each communication within the network a communication frame comprised of a predetermined number of timeslots. Each of the communication management modules may be further adapted to configure a communication module operatively coupled thereto to repeat a communication at one or more of the timeslots of the frame allocated for the communication. Each of the two or more synchronization modules may be operatively connectable to a communication module. The two or more synchronization modules may be adapted to synchronize frames between the communication modules operatively connected thereto.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
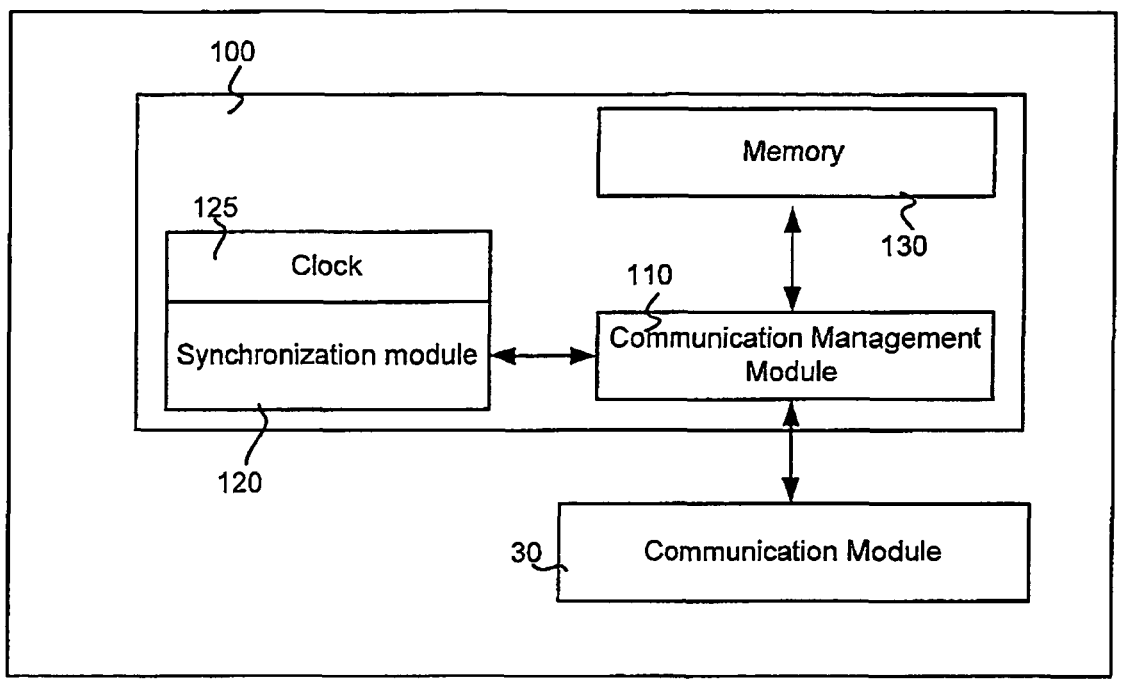
FIG. 1 which is a block diagram illustration of a node including a communication module and an apparatus for managing communications within a distributed network, in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "assigning" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Reference is now made to FIG. 1, which is a block diagram illustration of a node including a communication module and an apparatus for managing communications within a distributed network, in accordance with some embodiments of the present invention. As part of some embodiments of the present invention, each node within a distributed network (not shown), of which the node 15 is part of, may include a communication module 30 and a copy of the apparatus 100 for managing a communication module. As part of some embodiments of the present invention, the communication module 30 may be utilized to communicate with one or more of the other nodes in the network. The communication module 30 may be operatively coupled to the apparatus for managing the communication module 100 according to some embodiments of the present invention. In accordance with some embodiments of the present invention, each copy of the apparatus 100 may be adapted to control some aspects of the operation of the communication module 30 coupled thereto, as will be described in greater detail hereinbelow.

Figure 2A:
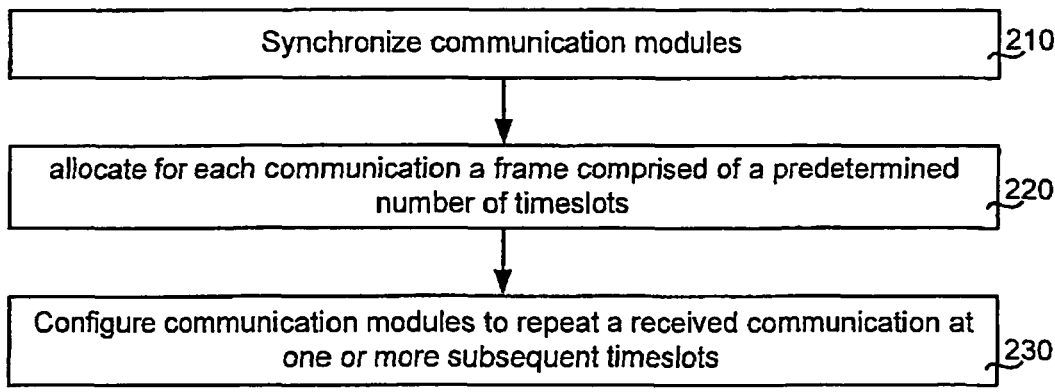
FIG. 2A is a flowchart illustration of a method of managing communications within a distributed network, in accordance with some embodiments of the present invention.

In accordance with some embodiments of the present invention, each apparatus 100 for managing a communication module may include a communication management module 110 and a synchronization module 120. Reference is now additionally made to FIG. 2A, which is a flowchart illustration of a method of managing communications within a distributed network, in accordance with some embodiments of the present invention. In accordance with some embodiments of the present invention, the synchronization module 120 may be adapted to synchronize the communication module 30 with each of the other communication modules within the distributed network (block 210). For example, in accordance with some embodiments of the present invention, each copy of the apparatus 100 may utilize the synchronization module 120 included therein to synchronize the communication module 30 coupled thereto with each and all of the other communication modules within the distributed network.

In accordance with further embodiments, the synchronization module 120 may be utilized in a manner to maintain the bit synchronization of the communication modules 30 within the communication network. For example, the synchronization module 120 may be utilized before each allocation of a communication frame. In accordance with another example, the synchronization module 120 may be utilized routinely at predefined time intervals and/or whenever a predefined criterion or criteria is met, for example, whenever a time offset between the communication modules grows beyond a predetermined threshold. Various synchronization methods or techniques known in the present or yet to be devised in the future may be implemented in the synchronization module 120 and may be utilized by the synchronization module 120 to synchronize the communication module 30 coupled thereto with the other communication modules within the network and to maintain the communication modules at a substantially synchronized state, including, but not limited to, the adjustment of an adjustable clock 125 operatively coupled to each of the communication modules. Additional aspects of the synchronization of the communication modules according to some embodiments of the present invention shall be discussed in greater detail herein below.

In accordance with some embodiments of the present invention, the communication management module 110 may be adapted to allocate for each communication within the network 10 a communication frame comprised of a predetermined number of timeslots (block 220). The communication management module 110 may be further adapted to configure the communication module 30 coupled thereto to repeat a communication at one or more of the timeslots of the frame allocated for that communication (block 230), as will be described in greater detail below. In accordance with some embodiments of the present invention, each communication frame may correspond to a predetermined amount of time. The timeslots may be equal in length to one another and may correspond to a predetermined fraction of the length of a communication frame. In accordance with some embodiments, since each of the communication modules 30 within the distributed network is synchronized with each and all of the other communication modules within the distributed network, the beginning of each allocated frame, as well as of each timeslot of each frame, may be synchronized throughout the network.

Figure 3:
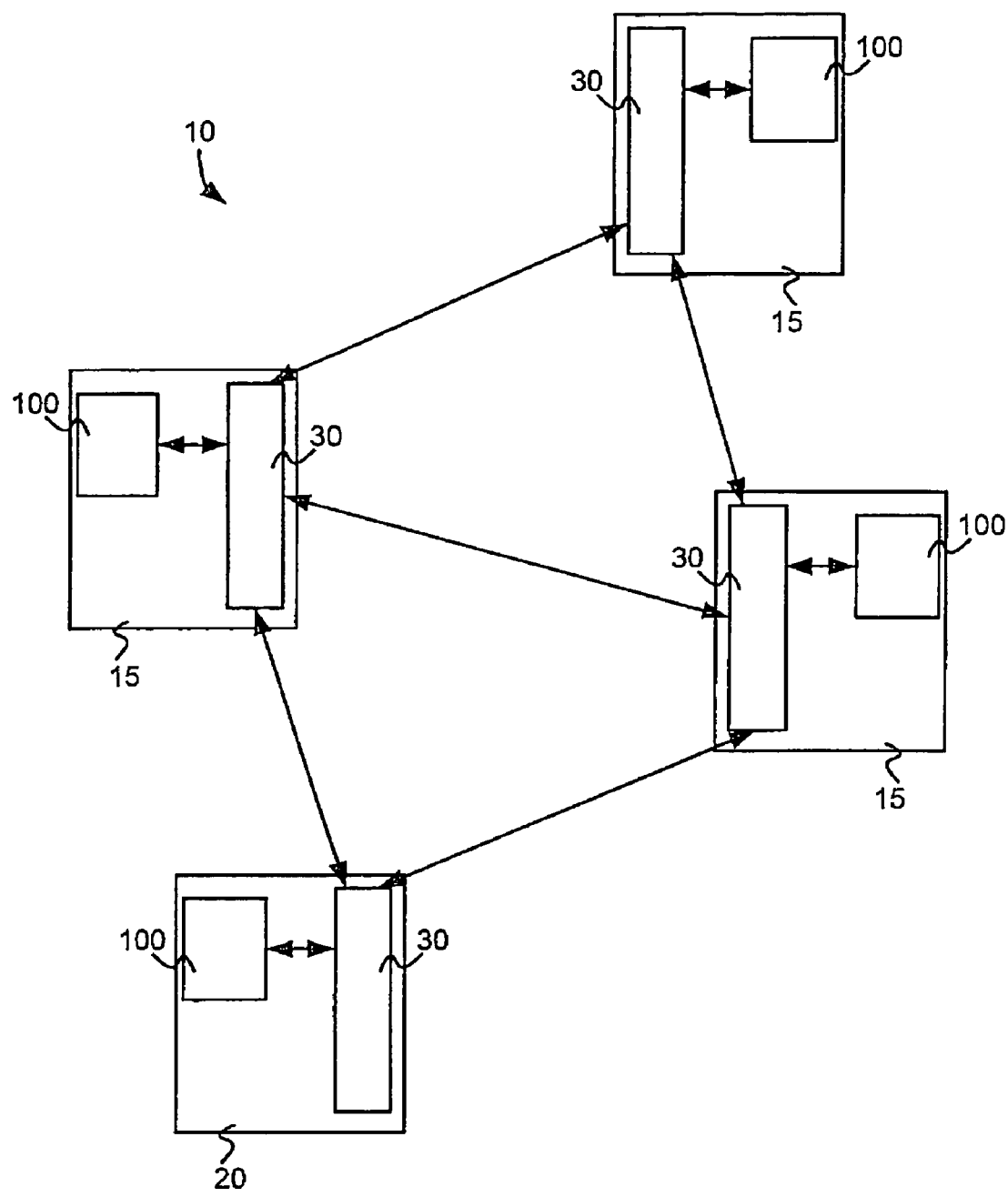
FIG. 3 is block diagram illustration of a simplified model of distributed network 10 comprised of a plurality of nodes, each including an apparatus for managing communications within the distributed network, according to some embodiments of the invention.

Reference is now made to FIG. 3, which is a block diagram illustration of a simplified model of distributed network 10 comprised of a plurality of nodes, each including an apparatus for managing communications within the distributed network, according to some embodiments of the invention. Each node 15 within the network 10 may include or be associated with the apparatus 100 for managing communications within the network. Each node 15 within the network may also include at least a communication module 30, and the apparatus for managing communications within the network 100 may be operatively coupled to the communication module 30. As part of some embodiments, the communication modules 30 may be any presently known or yet to be devised in the future transceiver(s) or similar communication device or devices capable of transmitting communications to each of the other nodes 15, either directly or indirectly, and capable of receiving communications from each of the other nodes 15, either directly or indirectly. According to some embodiments of the present invention, each (copy of the) apparatus 100 may be adapted to manage some aspects of the operation of the communication module 30 coupled thereto as described throughout the specification.

In accordance with some embodiments of the present invention, the distributed network 10 may include a central unit 20. The central unit 20 may include a communication module 30 and a copy of the apparatus 100 for managing communications within the network according to some embodiments of the present invention. According to some embodiments of the present invention, the central unit 20 may be configured to manage and control some aspects of the operation of the other nodes 15 and may be utilized to collect data from the other nodes 15. For example, the central unit 20 and the other nodes 15, may be configured such that during normal operation mode, a node 15 is allowed to communicate only in response to a communication received from the central unit 20. In accordance with some embodiments of the present invention, the central unit 20 may control the communication traffic within the network during normal operation mode in a manner to allow only one of the other nodes to communicate at any given time. It should be noted that it is possible that the network 10 and each of the nodes 15 within the network, including the central unit 20 may, in accordance with some embodiments of the invention, be configured to operate in accordance with other operation modes, for example, a synchronization mode, a configuration mode, etc., and that during such other operation modes other communication rules may apply. It should also be noted that during any of these modes or during any other modes, the network may operate in accordance with the same communication rules which where discussed above with reference to the normal operation mode.

According to some embodiments of the present invention, each communication from the central unit 20 during the normal operation mode may be addressed to a specific node 15 within the network. According to yet further embodiments of the present invention, while the network is in normal operation mode, each of the nodes 15 within the network 10 (excluding the central unit 20) may be configured to transmit a communication over the network 10 only in response to a communication to that effect received from the central unit 20 and addressed to that node. For example, the central unit 15 may transmit a communication (during the frame allocated for that communication) to a specific node, instructing that node to provide the central unit certain data. Upon receiving the communication from the central unit 15, the destination node may retrieve the data requested by the central unit, and may transmit the data back to the central unit 20 at the first timeslot of a frame allocated for that communication. According to other embodiments of the present invention, the central unit 20 may include additional circuitry and/or software to enable the central unit 20 to control the other nodes or units 15 or to collect data from the other nodes or units 15.

In accordance with some embodiments of the present invention, the central unit 20 may be adapted to determine the length of each frame that is to be allocated for each communication within the network. In accordance with further embodiments of the present invention, the central unit may be adapted to determine the number of timeslots to be included in each frame allocated for each communication within the network. In accordance with some embodiments of the present invention the central unit 20 may be adapted to determine the number of timeslots to be included in each frame, in accordance with the number of repetitions necessary for delivering a communication to and/or from any of the other nodes in the network.

In accordance with some embodiments of the present invention, as part of determining the number of timeslots to be allocated for each communication within the network, the central unit 20 may initiate a configuration process aimed at determining the number of repetitions necessary for delivering a communication to and/or from any of the other nodes in the network. In accordance with one, non-limiting, exemplary embodiment of the present invention, as part of the configuration process, the central unit 20 may serially transmit to each of the nodes 15 within the network a communication, to which the node may be requested to respond by transmitting back to the central unit 20 an acknowledge message. The central unit 20 may either instruct (through the communication) each of the nodes 15 to include in the acknowledge communication the timeslot number during which the communication from the central unit was received, and/or (either alternatively or in addition), the central unit 20 may determine at which timeslot of the subsequent frame the acknowledge communication was received at the central unit 20. In case, for whatever reason, the central unit 20 does not receive an acknowledge communication during the subsequent frame, the central unit 20 may increase the number of timeslots included in each frame and may repeat the communication until an acknowledge communication is received at the subsequent frame from that node 15. This process may be repeated for each node within the network 10. Once the central unit 20 receives the acknowledge communication from all the nodes, it may determine what number of repetitions is necessary to allow the central unit to communicate with each of the nodes 15 and/or what number of repetitions is necessary to allow each of the nodes 15 to communicate with the central unit 20.

In accordance with some embodiments of the present invention, the distributed network 10 may be, for example, any kind of a command and control network. An example of a command and control network may include any network including a plurality of nodes associated with a central command and control node (for example, the central unit 20). A non-limiting example of a command and control network may be a slave/master network, wherein the central command and control unit is the master and each of the other nodes is a slave. Typically, in a distributed network, the command and control unit will be responsible for managing the operation of the other nodes and may communicate with the nodes for purposes of providing the nodes with operational instructions and/or to retrieve from the node or from the devices attached to the nodes operational data and parameters, as well as for other purposes.

In accordance with some embodiments of the present invention, the central unit 20 may be a specific predetermined and fixed node within the network 10. However, some embodiments of the present invention are not limited in this respect, and rather, in accordance with some embodiments of the present invention, the central unit 20 may be a dynamic network entity which may reside with two or more (e.g. each) of the nodes at different periods of time. In accordance with these embodiments of the present invention, the function of the central unit may be passed on amongst two or more of the nodes 15.

In accordance with some embodiments of the present invention, the communication management module 110 may be adapted to allocate frames routinely one after the other, such that when a frame ends the communication management module 110 allocates, either immediately, or after a predetermined amount of time, the next frame. The communication management module 110 may be configured to include a certain pause between subsequent frames, for example, in order to allow the receiving node to process the received communication and to generate a response (in case it is necessary) to the communication. The length of the pause in-between frames may be predefined. The length of the pause in-between frames may be dynamically adjusted, for example, by the central unit 20 if a response received from one of the other nodes 15 is incoherent or unintelligible or in case such an extension is requested by one of the nodes. In accordance with further embodiments of the present invention, the communication management module 110 may be adapted to allocate a frame only in response to a certain event, for example, following the receipt of a communication. In accordance with yet further embodiments of the present invention, the communication management module 110 may be adapted to allocate a frame only in response to the receipt of a communication from the central unit 20. This may be the case, for example, in some master/slave networks, wherein the central unit 20 (the master) is the initiator of all communications within the network 10, and each of the other nodes 15 is configured to transmit a communication only in response to a communication received from the central unit 20. In this case, the communication management module of the central units 20 may have a different configuration from all the other communication management modules in the network, and may be capable of allocating a communication frame independently (and not only in response to a communication received at the central unit.

In accordance with yet further embodiments of the present invention, the communication management module 110 may be adapted to allocate less (or more) than a complete sub frame for various kinds of communications within the network. For example, for communications from the central unit to (one of) the other nodes, only some portion of a complete frame may be allocated. In another example, the controller 110 may be adapted to allocate service frames for communications between two or more nodes 15 (including with the command and control unit 20), for example, in order to enable the copies of the controller 110 to update one another with various operational data and/or in order to collect operational data, for example. In accordance with some embodiments of the present invention, during the service frames the communication management modules 110 may be configured to allow more than one communication to be transmitted and/or repeated within the network.

It should be noted that one or more components of the apparatus 100 for managing communications within the distributed network, may be implemented as part of the central unit and may be associated with more than one communication module 15, while retaining its functionality. Thus, it should be further noted, that throughout the specification and the claims, any reference made to a central apparatus for managing communications within a distributed network or to a central component of such apparatus may be replaceable with a plurality of copies of the same apparatus or of the same components which reside on or are operatively coupled to each node within the network and vice-versa.

As mentioned above, following the allocation of a frame including a predefined number of timeslots for a certain communication (block 220), the communication management module 110 may be further adapted to configure the communication module 30 coupled thereto to repeat a communication at one or more of the timeslots of the frame allocated for that communication (block 230). In accordance with some embodiments of the present invention, each communication management module 110 may be adapted to configure the communication module 30 coupled thereto, to transmit a new communication at the first timeslot of the frame allocated for that communication.

In accordance with further embodiments of the present invention, each communication management module 110 may be adapted to configure the communication module 30 coupled thereto to repeat a communication at one or more of the timeslots of the frame allocated for that communication following the initial transmission of the communication. In accordance with further embodiments of the present invention, each communication management module may be adapted to configure the communication module 30 coupled thereto to repeat a communication up-to the end of the frame. In accordance with further embodiments of the present invention, each communication management module 110 may be adapted to configure the communication module coupled thereto to repeat a communication up-to a predetermined timeslot of the frame allocated for the communication.

In accordance with yet further embodiments of the present invention, each communication management module 110 may be adapted to configure the communication module 30 coupled thereto to repeat a communication at one or more of the timeslots of the frame allocated for that communication, whether it is associated with the node which originated the communication or whether it is associated with one of the other nodes. In accordance with some embodiments of the present invention, in case a communication is received at one of the nodes (not the node which originated the communication) during a certain timeslot, the communication management module 110 of that node may be adapted to configure the communication module 30 coupled thereto to repeat the received communication at one or more timeslots of the frame subsequent to the receipt of the communication. In accordance with further embodiments of the present invention, the communication management module 110 may be adapted to configure the communication module 30 coupled thereto to repeat a communication up-to a predetermined timeslot or until an indication is received that the communication was repeated by another communication module, other than by a communication module from which the communication was received.

Figure 2B:
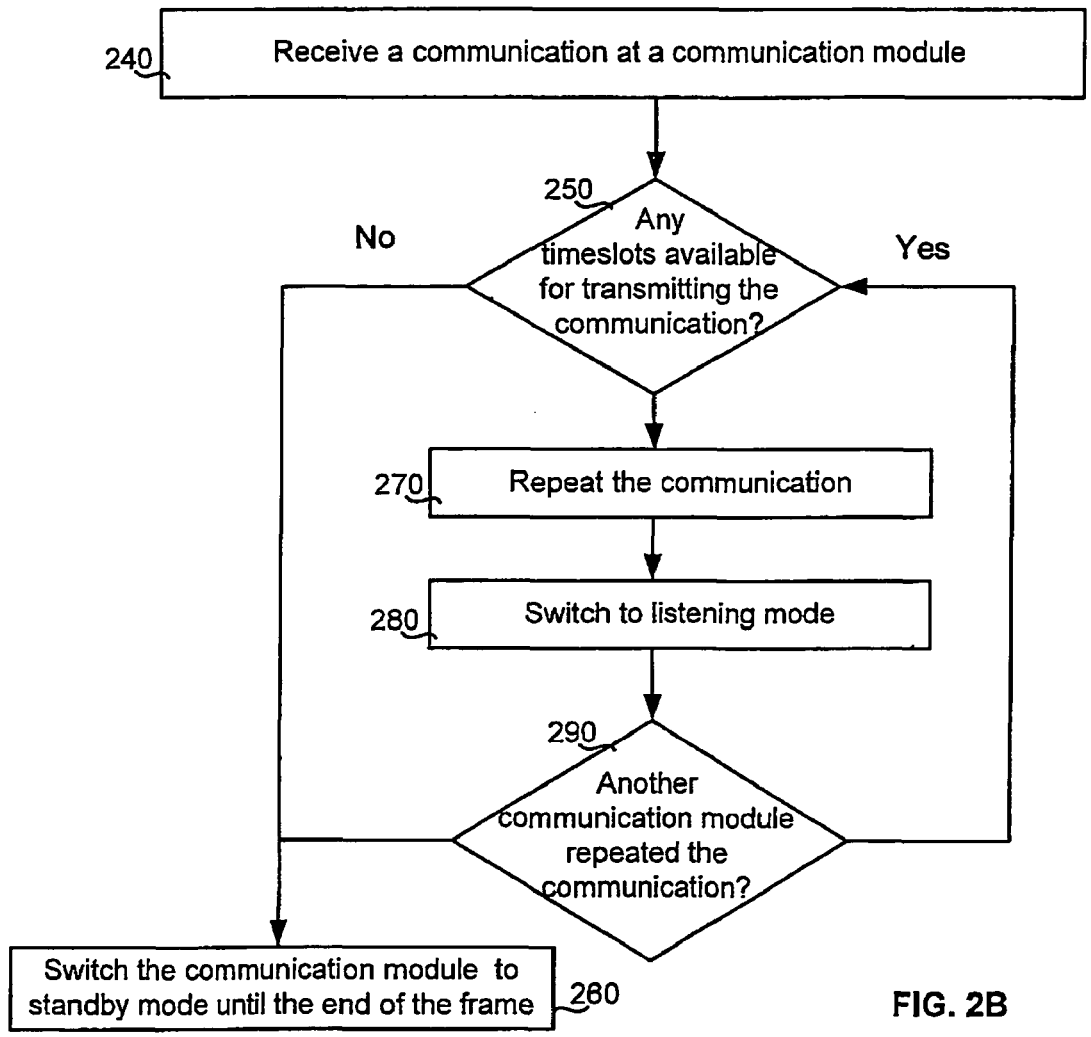
FIG. 2B is a flow chart illustration of some aspects of the method of managing communications within a distributed network, in accordance with some embodiments of the present invention.

Reference is now additionally made to FIG. 2B, which is a flow chart illustration of some aspects of the method of managing communications within a distributed network, in accordance with some embodiments of the present invention. In accordance with some embodiments of the present invention, a communication may be received at a certain communication module 30 associated with a certain node 15 (block 240). Once the communication is received by the communication module, the communication management module 110 associated with the receiving node 15 and coupled to the receiving communication module 30 may be adapted to determine whether there are any timeslots available for repeating the communication (block 250). For example, as part of determining whether there are any timeslots available for repeating the communication, the communication management module 110 may determine whether the communication was received before a predetermined timeslot of the frame allocated for that communication, after which, the communication module 30 may not be not allowed to repeat the communication (for example, after the last timeslot of the frame allocated for the communication).

In accordance with some embodiments of the present invention, in case it is determined that the communication was received beyond a predetermined timeslot and that there are no available timeslots for repeating the communication, the communication management module 110 may switch the communication module 30 coupled thereto to a standby mode until the end of the frame (block 260). In accordance with some embodiments of the present invention, while in the standby mode, the communication module 30 may remain passive or inactive and may only receive communications being propagated through the network 10.

However, in accordance with further embodiments of the present invention, if at block 250 it is determined that there are one or more timeslots or at least a predefined number of timeslots available for repeating the communication, for example, in the case where the communication was received before a predetermined timeslot, the communication management module 110 may configure the communication module 30 coupled thereto to repeat the communication at one or more subsequent timeslots (block 270). In accordance with some embodiments of the present invention, after the one or more repetitions of the communication, the communication management module 110 may be adapted to switch the communication module 30 coupled thereto to a listening mode (block 280). In accordance with some embodiments of the present invention, during the listening mode, the communication management module 110 may temporarily store the communication in a memory 130 operatively coupled to the communication management module 110. For example, in accordance with some embodiments of the present invention, upon receiving a communication and determining that there are available timeslots for repeating the communication, the communication management module 110 may configure the communication module 30 coupled thereto to repeat the communication at the next timeslot, and at the timeslot immediately following the transmission of the repeated communication, the controller may switch the communication module to the listening mode. In accordance with further embodiments of the present invention, the communication management module 110 may be configured to maintain the communication module 30 coupled thereto in the listening mode for the duration of at least two timeslots following the transmission of a communication. By maintaining a transmitting communication module 30 in the listening mode during at least the two timeslots following the transmission of the communication, the next repeating communication module 30 thus may have at least one "clean" timeslot for repeating the communication, after which it may also switch to the listening mode. While in the listening mode the communication module 30 may listen for repetitions of the communication other than by the unit from which it received the communication. If while it is in the listening mode, the (next) repeating module does not receive an indication that the communication was repeated by one or more of the other communication modules (other than the communication module from which it received the communication) it may repeat the communication after the listening mode ends and it may repeat this procedure up to the end of the frame. This way the communication management module 110 may improve the chances of the transmission being propagated, as will be explained below.

In accordance with some embodiments of the present invention, while the communication module 30 is in the listening mode, the communication management module 110 in cooperation with the communication module 30 coupled thereto may be adapted to listen to communications being propagated over the network to detect repeated transmissions of the communication (block 290). The repeated transmissions may be indicative of the communication being received and repeated by one or more of the other nodes 15. In accordance with some embodiments of the present invention, in case the communications management module 110 determines that the communication was repeated by another node (during the listening mode), the communication management module may be adapted to switch the communication module 30 coupled thereto to the standby mode (block 260).

According to some embodiments of the present invention, each communication management module 110 may be adapted to include in the metadata (or elsewhere) of each communication an ID corresponding to the node 15 from which the communication is about to be transmitted. In accordance with further embodiments of the present invention, whenever a communication is received by a communication module 30, the communication management module 110 attached to that communication module 30 may be configured to determine from which node the communication is received. In accordance with further embodiments of the present invention, the communication management module 110 may be configured to switch the communication module 30 coupled thereto to the standby mode, only if the communications management module 110 determines that the communication was repeated by another node (during the listening mode) other than the node from which the communication was received in the first place.

In accordance with some embodiments of the present invention, if at block 290 during the time that the communication module is kept in the listening mode, no indication is received that the communication was repeated by another communication module, the communication management module 110 might return to block 250 and determine whether there are any timeslots available for repeating the communication once again. In accordance with further embodiments of the present invention, the communication management module 110 might return to block 250 also in case that the only indication of a repeated transmission of the communication is received from the node from which the communication was received in the first place. In accordance with some embodiments of the present invention, each communication management module 110 may be adapted to add or to inject to each transmission, various data relating to various network information and/or transmission information, including, but not limited to, data relating to the identity of the transmitting communication module or to the node from which the communication is transmitted. The data relating to the transmitting communication module (or node) may enable each of the communication management modules of the nodes which are in receipt of the transmission, to determine which communication module or node transmitted the communication. In accordance with further embodiments of the present invention, the communication management module 110 may be configured to inject additional data to each transmission within the network.

In accordance with some embodiments of the present invention, one or more timeslots may pass between the time a communication is transmitted by one node and the repeated transmission of the communication is detected at another node (for example, at the node from which the communication was received at the transmitting node). Therefore, before each repetition of the communication, the communication management module 110 may be adapted to determine whether there is still a sufficient number of timeslots available for repeating the communication again (block 270) and/or for switching the communication module 30 to the listening mode again (block 280).

In accordance with some embodiments of the present invention, if it is determined at block 290, that there is not a sufficient number of timeslots available to repeat the communication once again, the communication management module 110 may switch the communication module 30 coupled thereto to the standby mode until the end of the frame (block 260). If, however, it is determined that there is still some number (including one) of timeslots available for repeating the communication, the communications management module 110 may be adapted to instruct the communication module 30 coupled thereto to repeat the communication again, and if there is a sufficient amount of timeslots available, may switch the communication module 30 to the listening mode again following the transmission of the communication (block 280).

In accordance with further embodiments of the present invention, if at block 250 it is determined that there is a sufficient number of timeslots available for repeating the communication but not for switching the communication module 30 to the listening module, the communication management module 110 may be adapted to instruct the communication module 30 coupled thereto to repeat the communication and may switch the communication module 30 to the standby mode immediately following the repeating of the communication without switching the communication module 30 to the listening mode. In accordance with yet further embodiments of the present invention, the communication management module 110 may be adapted to skip the listening mode for a variety of other reasons and in accordance with further criteria and for only some of the communication modules or for all of them and only in response to some events or to none at all.

In accordance with some embodiments of the present invention, in some cases, even though an indication is received at block 290 that the communication was repeated while the communication module was in the listening mode, the communication management module 110 may be configured to return to block 250 to determine whether there are sufficient available timeslots to repeat the communication again. Some embodiments of the present invention relating to such cases, were discussed above with greater detail and may include, for example, a repeated transmission in case the only indication of a repeated transmission relates to a repetition by the communication module from which the communication was received.

In accordance with some embodiments of the present invention, the controller 110 may be adapted to maintain the communication module in listening mode for a duration, which corresponds to two or more timeslots following each transmission or repetition of a communication. It should be noted that in accordance with some embodiments of the present invention, that by waiting two timeslots or more it is possible for each of the communication management modules 100 to listen for communications from the other nodes and to verify that the communication was repeated and letting that other unit verify that a third unit has repeated its transmission.

In accordance with some embodiments of the present invention, in some cases, at a given point in time, two or more pending communications may exist within the network. Since, in accordance with some embodiments of the present invention, during any frame only the communication for which the frame was allocated is allowed, a priority may be required in order to determine the order by which frames are to be allocated for the two or more pending communications. Thus, in accordance with some embodiments of the present invention, whenever a communication management module 110 detects that a new communication is created at the node 15 with which it is associated, the communication management module 110 may be configured to check with the other communication management module 110 within the network, whether there are any other pending communications competing for the next frame. In accordance with one embodiment of the present invention, the communication management modules 110 and the nodes at which a pending communication exist may together or collectively decide on the priority and allocate the communication frames accordingly. It should be noted that in accordance with further embodiments of the present invention other method or techniques may be used to determine the situation, which may occur in some embodiments of the present invention, wherein two or more pending communications are compete over a certain communication frame. As mentioned above, the communication management modules 110 may be configured to check for competing pending communications in-between frames, and a specific service frame may be allocated to this end. However, as mentioned above, in accordance with some embodiments of the present invention, each of the communication management modules 110 may be allowed to initiate a communication only in response to a communication received from a central unit 20. In accordance with one embodiment of the present invention, the central unit's communication management module 110 may be configured to allow for communications with only one node at any point in time.

In accordance with some embodiments of the present invention, each communication frame may correspond to a specific period of time. In accordance with further embodiments of the present invention, the timeslots may be equal to one another, and the duration of each timeslot may be equal to a predefined fraction of the length of the frame. In accordance with some embodiments of the present invention, the communication management module 110 may be adapted to modify from time to time the length of each frame in accordance with various network operation parameters or in accordance with other criteria. Also, in accordance with further embodiments of the present invention, the number of timeslots included in each frame may be modified from time to time, as will be discussed in greater detail hereinbelow.

In accordance with some embodiments of the present invention, the apparatus 100 may further include a memory (a storage medium, for example) 130. In accordance with some embodiments of the present invention, whenever a communication is received, the communication management module 110 may be adapted to forward the received data to the memory 130 for temporary storage. Next, in case the communication management module 110 determines that the received transmission is to be repeated, the management module 110 may retrieve the data from the memory 130 and may cause the communication module 30 to transmit the data at the start of a subsequent timeslot (or at any other predetermined point during the subsequent timeslot). In accordance with further embodiments of the present invention, in case a certain node 15 generates a communication and wishes to transmit the communication over the network 10, but a frame cannot be currently allocated for communication (for example, since the network is in the middle of a frame which was allocated to another communication), the communication management module 110 may be adapted to temporarily store the communication in the memory 130, until a frame can be allocated for the communication.

Figure 4:
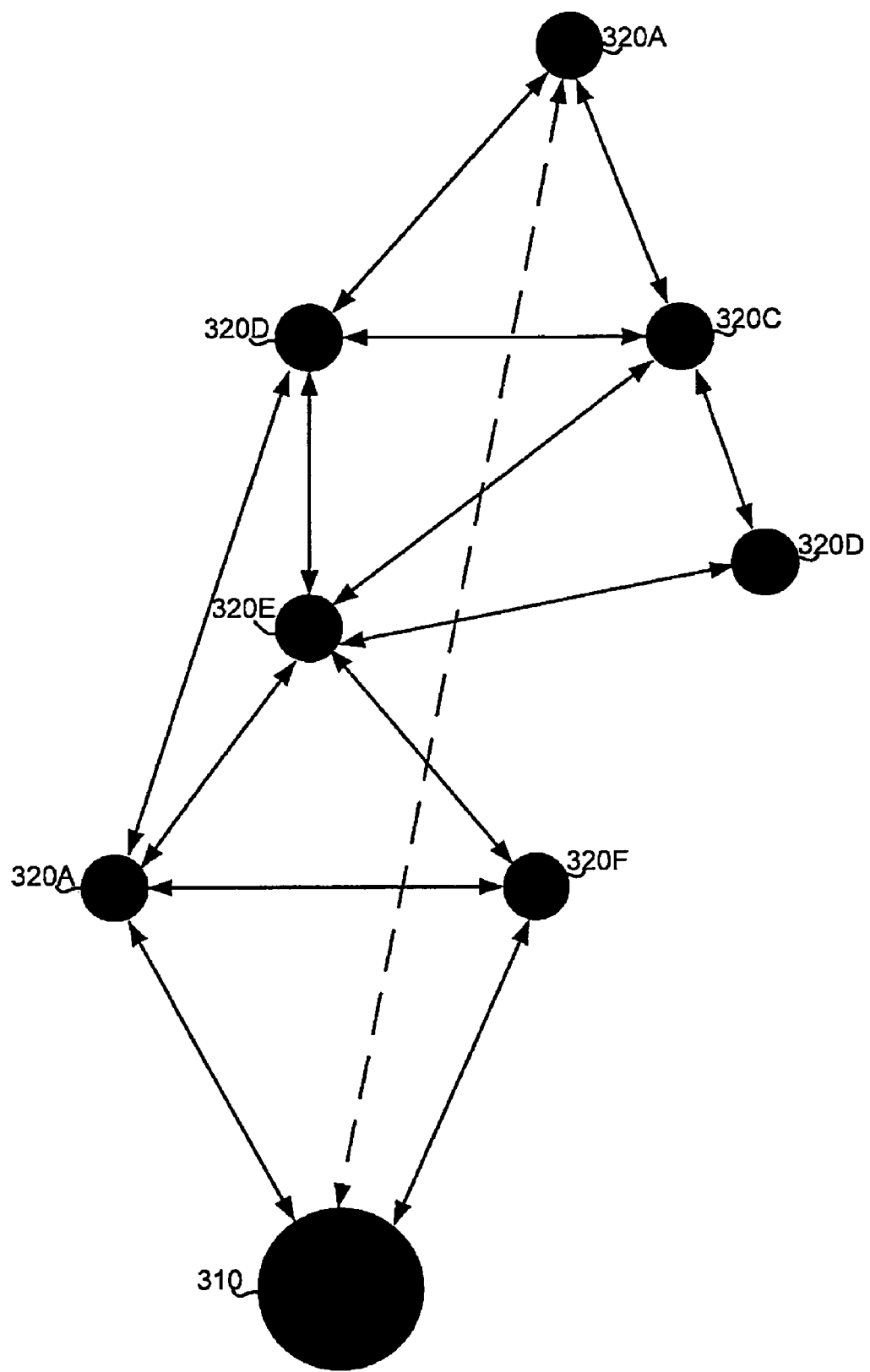
FIG. 4 is a block diagram illustration of a distributed network in which the apparatus in accordance with some embodiments of the present invention is implemented.

Reference is now additionally made to FIG. 4, showing a block diagram illustration of a distributed network in which the apparatus in accordance with some embodiments of the present invention is implemented. As part of some embodiments of the present invention, the distributed network 300 shown in FIG. 4, and in which the apparatus in accordance with some embodiments of the present invention may be implemented, may include a central node 310 and a plurality of network nodes 320A-320G. For convenience purposes we describe below transmissions in the direction from one (or more) of the network nodes 320A-320G to the central node 310. It should be noted however, that the present invention is not limited to the management of communication in any one particular direction, and may be used to manage, for example, communications from the central node 310 to any of the network nodes 320A-320G or from any node to any other node within the network.

In accordance with some embodiments of the present invention, each node's 310 and 320A-320G communication management module may be adapted to configure the communication module coupled thereto to allocate a communication frame for each communication within the network and to repeat the communication at one or more of the timeslots of the frame following the initial transmission of the communication. In accordance with yet further embodiments of the present invention, each node's 310 and 320A-320G communication management module may be adapted to configure the communication module coupled thereto to transmit a new communication at the first timeslot of the frame allocated for the communication.

For illustration purposes, we will assume that the communication management module 110 of each of the nodes 310 and 320A-320G is configured to allocate a frame for a communication that is to be transmitted from network node 320A and which is addressed to the central command and control node 310, according to some embodiments of the present invention. Once a frame has been allocated for the communication, node 320A may transmit the new communication at the first timeslot of the frame allocated by the communication management modules. We will further assume that, for various reasons (for example, physical distance, local interference, etc,), the communication from node 320A may not be able reach its final destination directly (in this case, the command and control node 310). However, in accordance with some embodiments of the present invention, one or more of the other nodes, for example, nodes which are closer to the source node or nodes which are not affected by the obstruction, may receive the communication. For illustration purposes we further assume that the communication transmitted by node 320A is received by nodes 320C and 320D. In accordance with some embodiments of the present invention, the communication management module of each of the receiving nodes 320C and 320D may be configured to cause the communication modules of the nodes to 320C and 320D repeat the received communication at one or more timeslots of the frame allocated for that communication.

In accordance with some embodiments of the present invention, all the communication modules within the network may be bit synchronized, and thus nodes 320C and 320D may transmit the repeated communication substantially simultaneously. By repeating the communication the network nodes may cause the communication to spread through the network 300. Thus, the communication may eventually reach one or more nodes which are able to directly communicate with the destination node 310, and since that (these) node(s) is (are) also configured to repeat the communication (assuming that the communication is received before a certain timeslot), these node(s) may also repeat the communication and cause the communication to be received at the destination node, in this case at the command and control unit 310.

In the embodiments described above, each communication module within the network, which received a communication during a certain frame, may be configured to repeat the communication at one or more subsequent timeslots allocated for that communication. In accordance with these embodiments of the present invention, in addition to the node which initiated the communication, each of the nodes which received the communication during the frame allocated for that communication may be configured to repeat the communication at each timeslot following the receipt of the communication, for example, until the end of the frame. In accordance with these embodiments of the present invention, many repetitions of the communication may be transmitted at each timeslot of the frame, one by each node which previously received a transmission, causing both an increase in the magnitude and quality of the signal in some places (the typical result) and a deterioration in other places (a less typical result) due to destructive diffraction, for example. In accordance with some embodiments of the present invention, in order to improve the signal amplitude and quality in the places suffering from destructive diffraction, each of the communication management modules may be adapted to configure the communication module coupled thereto to modify each transmission or repetition in a manner to limit the destructive diffraction within the network. Various techniques may be used to reduce the destructive diffraction, including but not limited to, independently and randomly (or pseudo randomly) adjusting or modifying the amplitude of each repeated communication by the communication module coupled to each of the communication management modules 110.

Also as mentioned above, according to some embodiments of the present invention, following a repeated transmission of a communication, the communication management module 110 may be configured to switch the communication module 30 coupled thereto to a listening mode, during which, the communication module 30 is kept in a passive state. In addition to the other benefits attributable to the implementation of the listening mode, maintaining the transmitting communication module in the passive state may allow a receiving communication module to repeat the communication without being interrupted by transmissions from the transmitting communication module.

According to some embodiments of the present invention, following the initial transmission of the communication, the communication module of node 320A may be configured to repeat the communication up-to the end of the frame (or at a predetermined number of timeslots) or until an indication is received that the communication was repeated by another communication module, for example, by the communication modules associated with nodes 320C and 320D. In case the communication module of node 320A is configured to repeat a communication until it is repeated by another communication module, once such an indication is received, the communication module associated with node 320A may be configured to stop repeating the communication.

In accordance with further embodiments of the present invention, once the communication is received at nodes 320C and 320D, the communication modules associated with nodes 320C and 320D may be configured to repeat the communication at one or more timeslots subsequent to the receipt of the communication. In accordance with some embodiments of the present invention, the communication modules associated with nodes 320C and 320D may be configured to repeat the communication at a predetermined number of timeslots (or up-to the end of the frame) or until and indication is received that the communication was repeated by another communication module. However, in accordance with further embodiments of the present invention, the communication modules associated with nodes 320C and 320D may be configured to continue repeating the communication if the only indication of a repeated communication relates to the communication module from which the communication was received, or in this case, if the only indication relates to the communication module associated with node 320A.

In accordance with some embodiments of the present invention, the number of timeslots included within each communication frame may be determined in accordance with the minimal number of repetitions necessary to deliver a communication from any of the nodes within the network to a destination node. In accordance with some embodiments of the present invention, the destination node for purposes of determining the number of timeslots included within each communication frame may be a particular node or a non-particular node, for example, any node within the network. For example, the destination node may be a command and control unit, in which case, the number of timeslots to be included within each communication frame may be determined in accordance with the minimal number of repetitions necessary to deliver a communication from any of the nodes within the network to the command and control unit; or the destination node may be any of the other nodes within the network, in which case, the number of timeslots to be included within each communication frame may be determined in accordance with the minimal number of repetitions necessary to deliver a communication from any of the nodes within the network to any of the other nodes within the network.

The discussions below relate to the scenario wherein the number of timeslots to be included within each communication frame is determined in accordance with the minimal number of repetitions necessary to deliver a communication from any of the nodes within the network to the command and control unit. However it should be noted that, as mentioned above, the present invention is not limited in this respect. It would be readily apparent to those of ordinary skill in the art how to modify the embodiments of the present invention discussed below in case the number of timeslots to be included within each communication frame is to be determined in accordance with the minimal number of repetitions necessary to deliver a communication from any of the nodes within the network to any of the other nodes within the network.

In accordance with some embodiments of the present invention, as mentioned above, each frame may include a predetermined. number of timeslots. As part of some embodiments of the present invention, the initial number of timeslots to be included in each communication frame may be determined during the initialization of the network, as will be described in greater detail below. As will be further described below, as part of further embodiments of the present invention, the initial number of timeslots to be included in each frame may be dynamically adjusted during the operation of the network.

Figure 5:
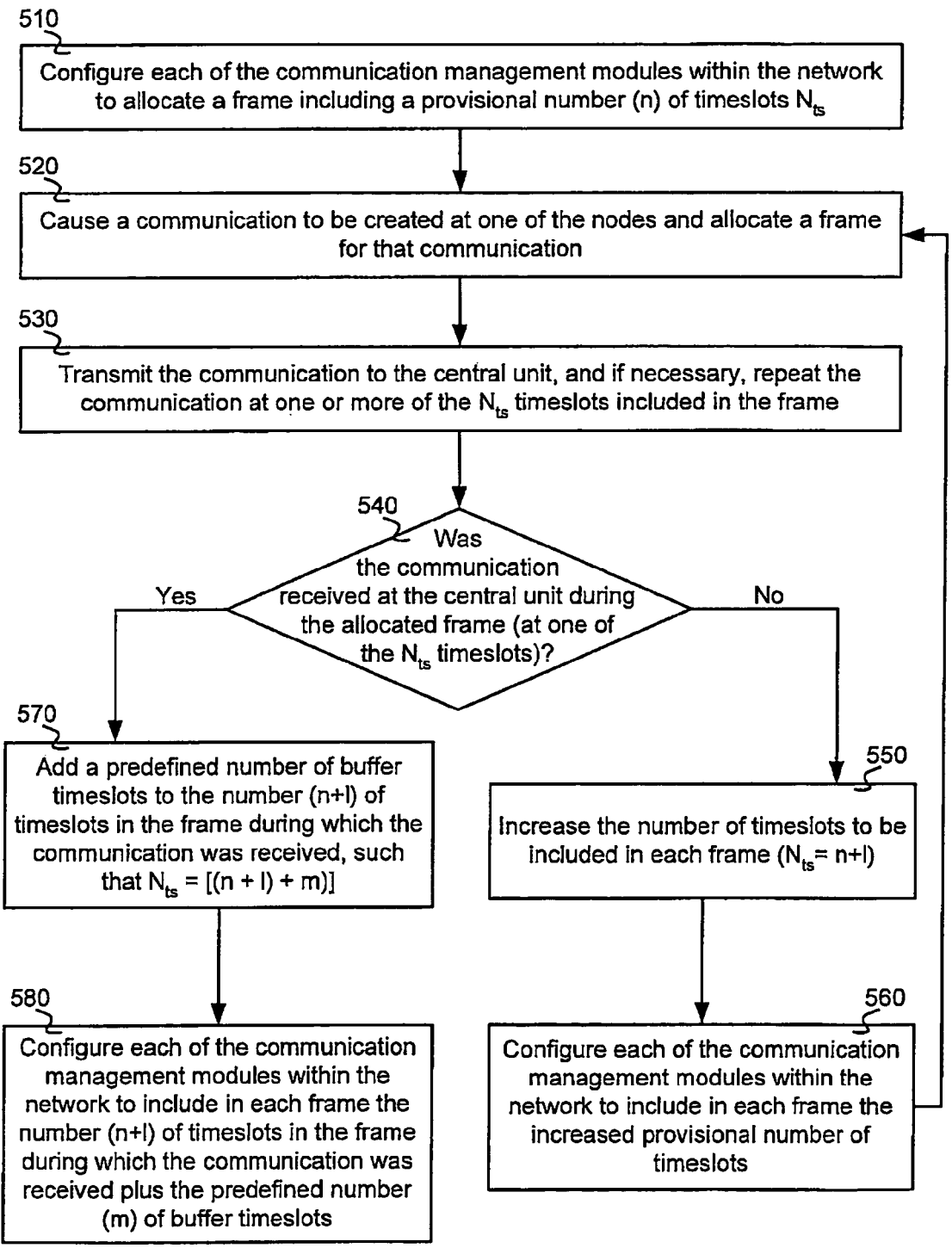
FIG. 5 is a flowchart illustration of a process of determining the initial number of timeslots to be included in a communication frame, as part of some embodiments of the present invention.

Reference is now made to FIG. 5, which is a flowchart illustration of a process of determining the initial number of timeslots to be included in a communication frame, as part of some embodiments of the present invention. The process of determining the initial number of timeslots to be included in each frame may begin by configuring each of the communication management modules within the network to allocate a frame including a provisional number (n) of timeslots $N_{ts}$ (block 510). The provisional number (n) of timeslots $N_{ts}$ to be included in each frame, may be predetermined, and may be, for example, programmed into each of the communication management units within the network. However, the present invention is not limited in this respect. In accordance with further embodiments of the present invention, the provisional number (n) of timeslots to be used may be substantially small, for example, two, in order to provide an efficient protocol in case only a small number of repetitions is needed. As will be discussed below, if the provisional number (n) of timeslots is too small to allow the minimal number of repetitions necessary to deliver a communication from any of the nodes within the network to the command and control unit, the provisional number of timeslots to be included number will be gradually incremented until it is large enough for the communication to reach its destination.

Once the communication management modules are configured, the central unit for example, may instruct one of the nodes to create a communication and to allocate a communication frame for the transmission of the communication (block 520). The node may transmit the communication to the central unit, for example, and if necessary, the communication may be repeated (by the source node or by one of the other nodes) at one or more of the $N_{ts}$ timeslots included in the frame (block 530). At the end of the frame allocated for the communication, the destination node may be checked to determine whether the communication was received at the destination node during the allocated frame (at one of the $N_{ts}$ timeslots of the frame) (block 540). For convenience purposes we assume that the destination node is the central unit.

In accordance with some embodiments of the present invention, if it is determined at block 540 that the communication was not received at the destination node during the allocated frame (at one of the $N_{ts}$ timeslots of the frame), the provisional number of timeslots to be included in each frame Nts may be incremented by a predetermined number (one or more), such that $N_{ts}=(n+1)$ (block 550), and each of the communication management modules within the network may be configured to include in each frame the increased provisional number of timeslots (block 560). Once each of the communication management modules within the network is configured to include in each frame the increased provisional number of timeslots, blocks 520-560 may be repeated over and over again, until a communication is received at the destination node (e.g., the central unit) during the allocated frame. If it is determined at block 540 that the communication was received at the destination node during the allocated frame, a predefined number of buffer timeslots may be added to the number (n+1) of timeslots in the frame during which the communication was received, such that $N_{ts}=[(n+1)+m)]$ (block 570), and each of the communication management modules within the network may be configured to include in each frame the number (n+1) of timeslots in the frame during which the communication was received plus the predefined number (m) of buffer timeslots (block 580).

Figure 6:
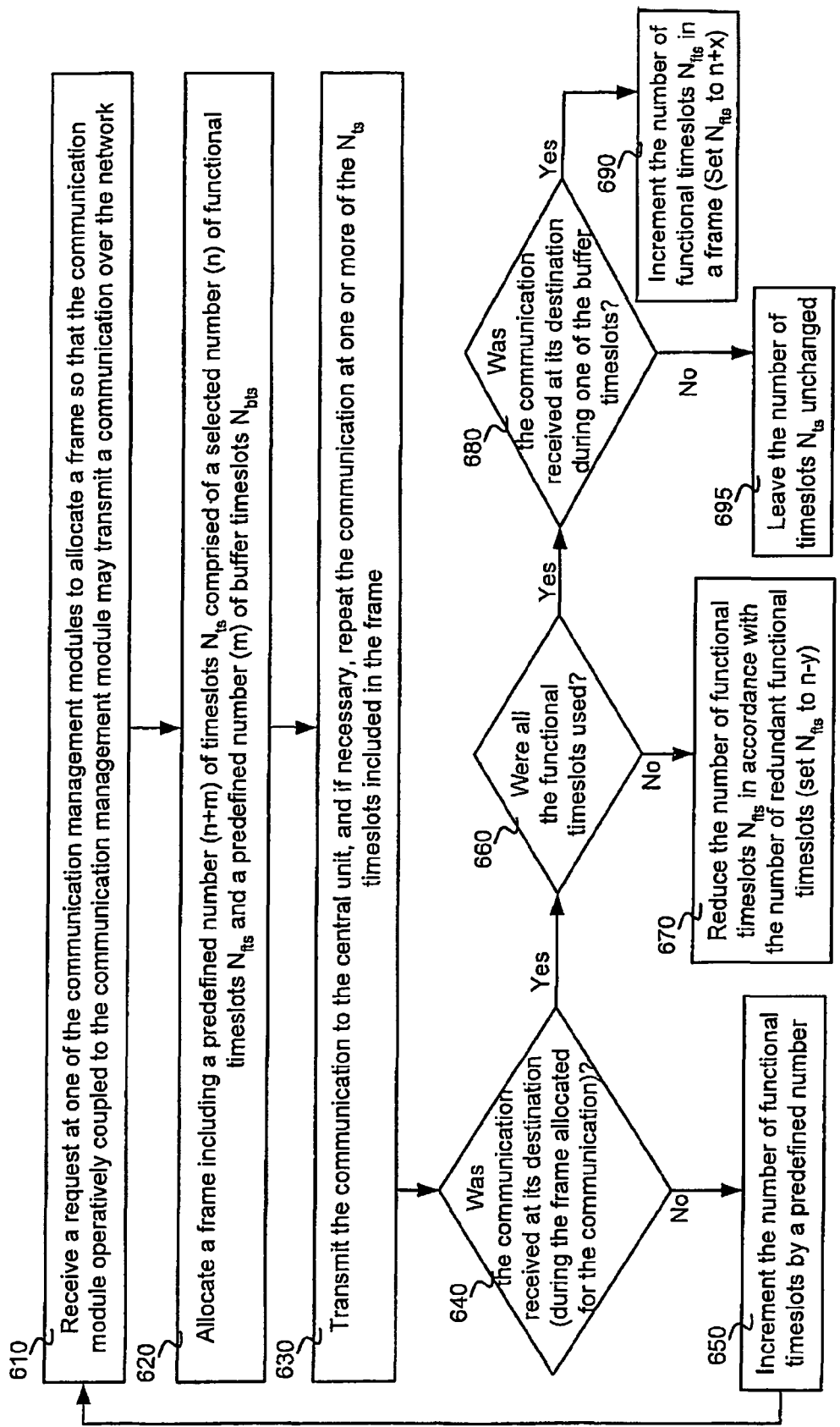
FIG. 6 is a flowchart illustration of a process of dynamically adjusting the number of timeslots to be included in a communication frame, as part of some embodiments of the present invention.

Reference is now made to FIG. 6, which is a flowchart illustration of a process of dynamically adjusting the number of timeslots to be included in a communication frame, as part of some embodiments of the present invention. Initially, a request may be received at one of the communication management modules to allocate a frame so that, for example, the communication module operatively coupled to the communication management module may transmit a communication over the network (block 610). In response to the request, a frame comprised of a predefined number (n+m) of timeslots $N_{ts}$, including a selected number (n) of functional timeslots $N_{fts}$ and a predefined number (m) of buffer timeslots $N_{bts}$, may be allocated (block 620). Next, the communication may be transmitted to its destination, for example, to the central unit, and if necessary in order to deliver the communication to its destination, the communication may be repeated as described above at one or more of the timeslots $N_{ts}$ included in the frame (block 630).

The communication management module at the destination node, which is, in this case, the central unit, may be configured to determine whether the communication was received, and in particular whether the communication was received during the frame which was allocated for the communication (block 640). The central unit may be in this case a master unit and each of the other nodes within the network may be slave type units. Thus, the central unit, being a master, may control communications within the network and may be configured to anticipate the receipt of a communication from a certain node during a certain frame. In accordance with some embodiments of the present invention, in case a communication was not received at the central unit during the frame allocated for the communication, the central unit may increment the number of functional timeslots $N_{fts}$ by a predetermined number (for example, by one) and blocks 610-640 may be repeated. In accordance with some embodiments of the present invention, blocks 610-650 may be repeated until the communication is received at the central unit during the frame allocated for the communication.

In accordance with some embodiments of the present invention, in case the communication is received at the central unit during the frame allocated for that communication, the communication management module, for example, of the central unit, may determine whether all the functional timeslots were used to deliver the communication to the central unit (block 660), as was discussed above as part of some embodiments of the present invention. In accordance with some embodiments of the present invention, if it is determined that less than all the functional timeslots were used to deliver the communication to the central unit, the number of functional timeslots $N_{fts}$ may be reduced in accordance with the number of redundant functional timeslots (set $N_{fts}$ to n–y) (block 670). The communication management module of the central unit may configure each of the communication management modules within the network to allocate from that point onwards (until the number of timeslots is next adjusted) frames including the adjusted number of functional timeslots $N_{fts}$.

In accordance with some embodiments of the present invention, if however at block 660 it is the determined that all the functional timeslots were used to deliver the communication to the central unit, the communication management module of the central unit may be configured to determine whether one or more of the buffer timeslots were used to deliver the communication to its destination, in this case, the central unit (block 680). In accordance with further embodiments of the present invention, the communication management module of the central unit may be configured to determine that a buffer (one or more) timeslots were used to deliver the communication to its destination if the communication is received at the destination during one of the buffer timeslots. In accordance with some embodiments of the present invention, if the communication management module determines that one or more of the buffer timeslots were used to deliver the communication to its destination, the number of functional timeslots may be incremented in accordance with the number of the buffer timeslots used to deliver the communication to its destination (Set $N_{fts}$ to n+x). The communication management module of the central unit may configure each of the communication management modules within the network to allocate from that point onwards (until the number of timeslots is next adjusted) frames including the adjusted number of functional timeslots $N_{fts}$.

In accordance with some embodiments of the present invention, if it is determined that all the functional timeslots were used to deliver the communication to the central unit and that no buffer timeslots were used to deliver the communication to its destination, the number of timeslots $N_{ts}$ may remain unchanged (block 695).

In accordance with some embodiments of the present invention, for the subsequent communications, the number of timeslots selected above (whether adjusted or not) may be included in the frame allocated for the communications until the number of timeslots to be included in each frame is adjusted.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A distributed communication network comprising:
    a set of wireless communication nodes including a subset of repeating nodes, wherein each of said nodes in said set is adapted to communicate using a frame based protocol including multiple time slots;
    each of said repeating nodes comprises:
        a communication module adapted to receive and to retransmit a communication transmitted by another node, such that during a single communication frame said communication module is adapted to retransmit a transmission originating from only a selected transmission source, and the selected transmission source changes from frame to frame;
        a synchronization module adapted to synchronize timing on said communication module such that all the repeating nodes have synchronized timing; and
    wherein upon receiving a communication from a selected source during a given frame and timeslot, directly or through a repeating node, said communication module is adapted to allocate two or more subsequent timeslots of the given frame for retransmission of the communication, such that at least two repeating nodes receiving the same communication during a timeslot of the given frame will repeat the received transmission during at least two other timeslots of the given frame.

2. The distributed communication network according to claim 1, wherein each of two or more repeating nodes receiving the same communication during a timeslot of the given frame will concurrently repeat the received transmission during at least one other timeslot of the given frame.

3. The distributed communication network according to claim 1, wherein at a subsequent communication frame, a node from amongst the subset of repeating nodes is a source of a subsequent communication and functions as a source node within the communication network, and the node which functioned as a source node during a previous communication frame functions as the repeating node during the subsequent communication frame.

4. The distributed communication network according to claim 3, wherein the timeslots within each communication frame are equal in length to one another and each timeslot corresponds to a predetermined fraction of the length of an entire communication frame.

5. The distributed communication network according to claim 1, wherein, upon receiving a communication at at least one of said plurality of repeating nodes, the respective communication module is adapted to retransmit the communication at one or more timeslots of the frame that are subsequent to the timeslot at which the communication was received at the repeating node.

6. The distributed communication network according to claim 5, wherein the communication module of at least one of the said subset of repeating nodes is adapted to configure the respective communication module to retransmit the communication received at the respective repeating node up to the end of the frame allocated for the communication.

7. The distributed communication network according to claim 5, wherein the communication module of at least one of said subset of repeating nodes is adapted to configure the respective communication module to retransmit a communication up to a predetermined timeslot or until an indication is received at the respective repeating node that the communication was retransmitted by a repeating node other than the repeating node from which the communication was received.

8. The distributed communication network according to claim 1, wherein at one or more nodes of said subset of repeating nodes, the respective communication module is adapted to alter the amplitude of each repetition of the communication.

9. The distributed communication network according to claim 8, wherein at at least one of the subset of repeating nodes, the respective communication module is adapted to randomly alter the amplitude of each repetition of the communication.

10. The distributed communication network according to claim 1, wherein at at least one of the plurality of repeating nodes, the communication module is adapted to switch to a listening mode following a transmission of a repetition of the communication.

11. The distributed communication network according to claim 10, wherein at said at least one of the subset of repeating nodes, the respective communication module is maintained in the listening mode for a predetermined number of timeslots.

12. The distributed communication network according to claim 11, wherein at said at least one of the subset of repeating nodes, the respective communication module is maintained in the listening mode for a duration spanning at least two timeslots.

13. The distributed communication network according to claim 12, wherein at said at least one of the subset of repeating nodes, the respective communication module is adapted to repeat the communication an additional time only in case that while the communication module was in the listening mode, no indication was received at the respective repeating node that the communication was transmitted by yet another repeating node, other than by a repeating node from which the communication was received.

14. The distributed communication network according to claim 13, wherein at said at least one of the subset of repeating nodes, said communication module is adapted to switch to a standby mode in case an indication is received that a communication transmitted by the respective repeating node was transmitted by yet another repeating node, other than by a repeating node from which the communication was received, or in case the current timeslot is later than a predefined timeslot.

15. The distributed communication network according to claim 11, wherein said at least one of the subset of repeating nodes further comprises a storage medium, and wherein the communication module of said at least one of the subset of repeating nodes is adapted to temporarily store a communication it transmitted while it is maintained in the listening mode.

16. The distributed communication network according to claim 1, wherein at at least one of the subset of repeating nodes, the communication module is adapted to include in each communication frame a selected number of functional timeslots and a predefined number of buffer timeslots which are the concluding timeslots of the frame.

17. The distributed communication network according to claim 16, wherein at said at least one of the subset of repeating nodes, the communication module is adapted to select the number of functional timeslots to be included in each communication frame in accordance with the number of repetitions determined to be required to deliver a communication within the network to its destination.

18. The distributed communication network according to claim 17, further comprising: a central communication unit that is the destination of the communication from the source node; and wherein at said at least one of the subset of repeating nodes, the communication module is adapted to select the number of functional timeslots to be included in each communication frame in accordance with the number of repetitions determined to be required to deliver the communication from the respective repeating node to the central communication unit.

19. The distributed communication network according to claim 18, wherein at said at least one of said plurality the subset of repeating nodes, said the communication module is adapted to adjust the number of functional timeslots to be included in each communication frame in case the number of timeslots required for delivering the communication from the respective repeating node to the central unit changes.

20. The distributed communication network according to claim 19, wherein at said at least one of the subset of repeating nodes, the communication module is adapted to adjust the number of functional timeslots to be included in each communication frame in case one or more of the buffer timeslots are used to deliver the communication from the respective repeating node to its destination.

21. A method of managing communications within a distributed communication network, comprising:
   communicating, using a frame based protocol including multiple time slots, among a set of wireless communication nodes, said set including a subset of repeating nodes;
   receiving and retransmitting a communication transmitted by another node, such that during a single communication frame a transmission originating from only a selected transmission source is retransmitted and the selected transmission source changes from frame to frame;
   synchronizing frame timing such that all said repeating nodes have synchronized timing; and
   allocating two or more subsequent timeslots of the given frame for retransmission of the communication, such that at least two of said repeating nodes receiving the same communication during a timeslot of the given frame will repeat the received transmission during at least two other timeslots of the given frame, upon receiving a communication from a selected source during a given frame and timeslot, directly or through a repeating node.

22. The method according to claim 21, further comprising transmitting a new communication at the first timeslot of the frame allocated for the communication.

23. The method according to claim 22, wherein retransmitting comprises repeating the communication through each one of the subset of repeating nodes at one or more timeslots subsequent to receipt of the communication.

24. The method according to claim 23, wherein retransmitting further comprises repeating the communication through at least one of the subset of repeating nodes up to the end of the frame allocated for the communication.

25. The method according to claim 23, wherein retransmitting further comprises repeating the communication through at least one of the subset of repeating nodes up to the end of the frame allocated for the communication or until an indication is received that the communication was repeated by another node, other than by the node from which the communication was received at the respective node.

26. The method according to claim 23, wherein retransmitting further comprises on at least one of the subset of repeating nodes, altering the amplitude of each repetition communication with respect to any previous communication transmitted by the same repeating node during the current frame.

27. The method according to claim 23, further comprising switching at least one of the subset of repeating nodes to a listening mode following a transmission of a repetition communication by the respective repeating node.

28. The method according to claim 27, wherein switching further comprises maintaining said at least one of the subset of repeating nodes in the listening mode for a predetermined number of timeslots following a transmission of a repetition of a communication by the respective repeating node.

29. The method according to claim 28, wherein maintaining comprises maintaining said at least one of the subset of repeating nodes in the listening mode during at least two timeslots following a transmission of a repetition communication by the respective repeating node.

30. The method according to claim 29, wherein retransmitting further comprises repeating the communication through said at least one of the subset of repeating nodes, while said repeating node is in the listening mode, only in case no indication is received that the communication was transmitted by another communication node, other than by a communication node from which the communication was received at the repeating node.

31. The method according to claim 21, wherein communicating further includes using a frame based protocol wherein a frame comprises a selected number of functional timeslots and a selected number of buffer timeslots which are to be the concluding timeslots of the frame.

32. The method according to claim 31, wherein communicating further includes selecting the number of functional timeslots to be included in each communication frame in accordance with the number of repetitions determined to be required to deliver a communication within the network to its destination.

33. The method according to claim 32, wherein communicating further includes adjusting the number of functional timeslots to be included in each communication frame, in case the number of timeslots required for delivering a communication within the network to its destination, changes.

34. The method according to claim 21, wherein a total number of the at least two other timeslots is equal to a total remaining number of timeslots of the given frame, and the two or more repeating nodes will repeat the received transmission for the remaining number of timeslots.

* * * * *